United States Patent [19]
Overton

[11] Patent Number: 5,894,497
[45] Date of Patent: Apr. 13, 1999

[54] REDUCING SPURIOUS MODULATION PRODUCTS IN BROADBAND MULTICARRIER TRANSMISSION BY COHERRENT SUMMATION OF THE OUTPUTS OF DISSIMILAR DIGITAL-TO ANALOG DEVICE TYPES

[75] Inventor: Roger L. Overton, New York, N.Y.

[73] Assignee: AirNet Communications Corp., Melbourne, Fla.

[21] Appl. No.: 08/770,871

[22] Filed: Dec. 20, 1996

[51] Int. Cl.$^6$ .................................................. H04L 27/04
[52] U.S. Cl. ............................................ 375/295; 455/91
[58] Field of Search .................................. 375/260, 295, 375/296, 285; 370/206, 210; 341/133, 155, 172; 455/59, 91

[56] References Cited

U.S. PATENT DOCUMENTS

| | | |
|---|---|---|
| 5,537,435 | 7/1996 | Carney et al. .................. 375/260 |
| 5,588,022 | 12/1996 | Dapper et al. .................. 375/260 |
| 5,675,572 | 10/1997 | Hidejima et al. .............. 370/210 |
| 5,748,677 | 5/1998 | Kumar ............................ 375/285 |

*Primary Examiner*—Tesfaldet Bocure
*Attorney, Agent, or Firm*—Farkas & Manelli PLLC; Russell O. Paige

[57] ABSTRACT

The Spurious-Free Dynamic Range (SFDR) in a broadband digital radio transceiver is typically limited by the required digital-to-analog converter which introduces differential nonlinearities that cause harmonic distortion in intermodulation products. The invention was a digital-to-analog conversion subsystem that coherently combines the outputs of two or more digital-to-analog converters that have different internal architectures. As a result, spurious responses are not correlated with one another while desired signal components do add coherently. The spurious responses therefore cancel in the combined output while the desired signal components add in phase. The overall result is to increase spurious-free dynamic range at the radio transmitter output.

8 Claims, 3 Drawing Sheets

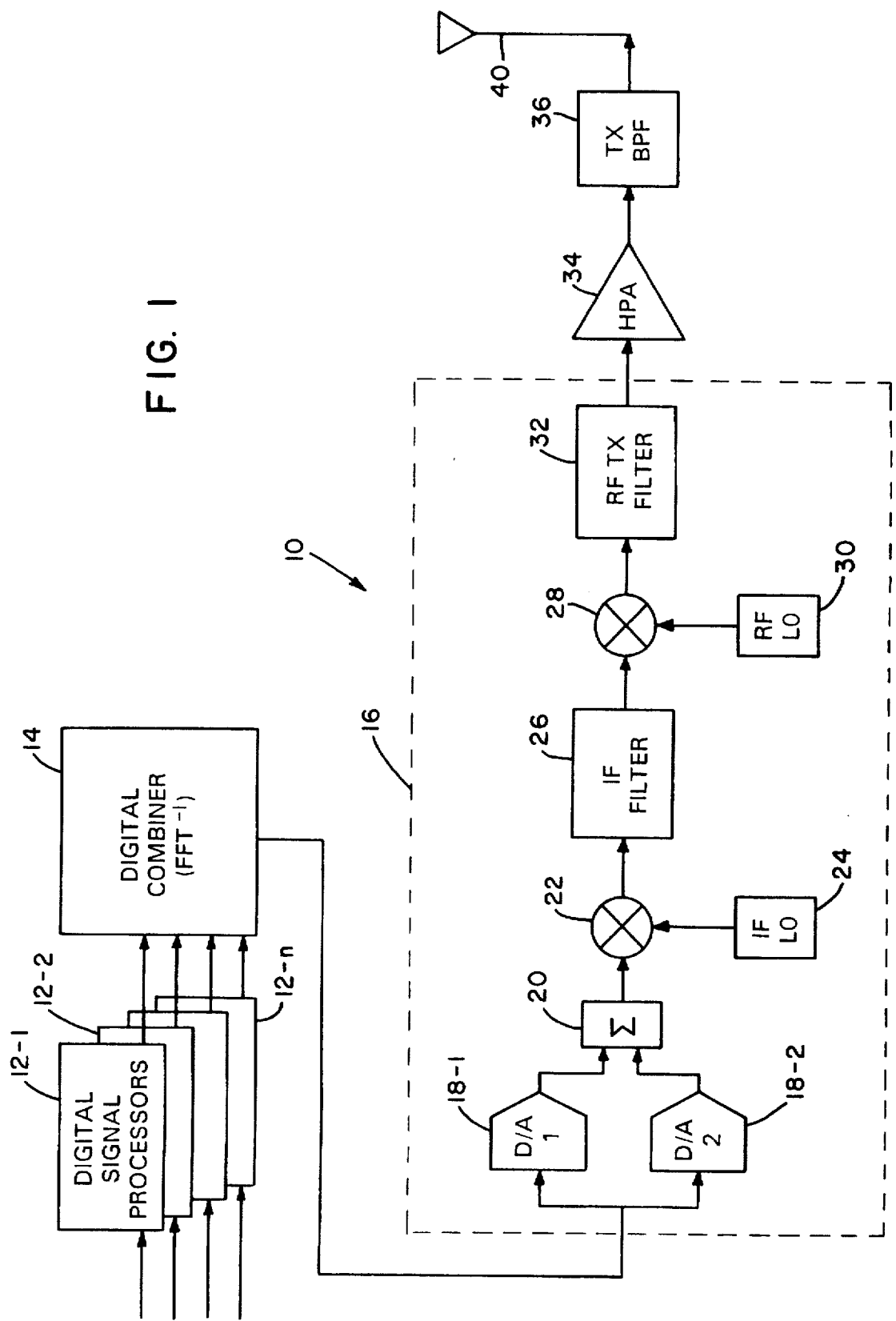

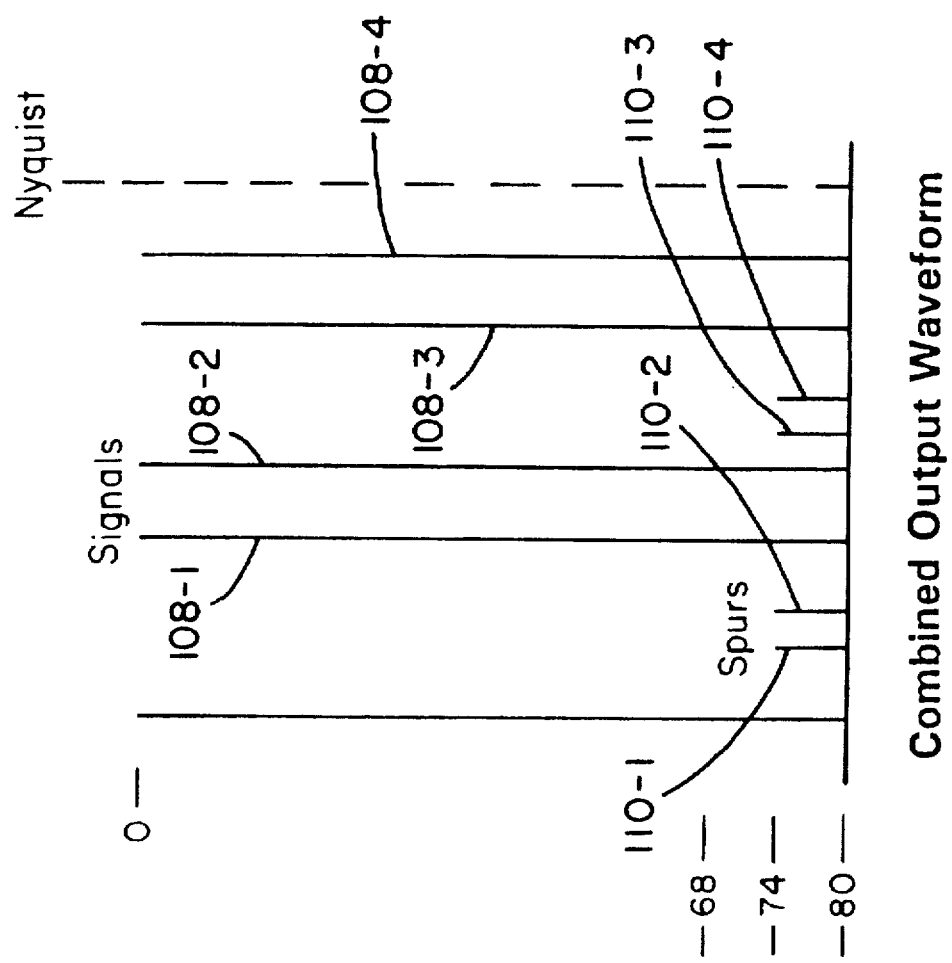

5,894,497

REDUCING SPURIOUS MODULATION PRODUCTS IN BROADBAND MULTICARRIER TRANSMISSION BY COHERRENT SUMMATION OF THE OUTPUTS OF DISSIMILAR DIGITAL-TO ANALOG DEVICE TYPES

FIELD OF THE INVENTION

This invention relates generally to multichannel radio communication systems and in particular to a technique for reducing the spurious products produced during a digital-to-analog conversion process in broadband multicarrier transmission equipment.

BACKGROUND OF THE INVENTION

Certain types of broadband multichannel radio transmitter equipment is finding increasing use in wireless communication systems such as Cellular, Mobile Telephone and Personal Communication Services systems. This equipment is capable of processing many Radio Frequency (RF)carrier signals using common radio frequency circuitry. The individual transmitted signals are first formed as digital baseband signals such as by a bank of Digital Signal Processors (DSPs). The digital baseband signals output by the DSPs are fed in parallel to a digital combiner which provides a composite signal in digital form. In the digital composite signal, the individual channel signals are each translated to a different digital intermediate frequency, typically as equally spaced digital carrier signals. The digital composite signal is then fed to a digital-to-analog converter, and the resulting multicarrier analog waveform is then fed to broadband Radio Frequency (RF) equipment.

While broadband transmission of many radio channels in parallel through the use of sophisticated digital signal processing techniques provides an advantage of compact size and low price, this comes at the cost of more sophisticated expensive Radio Frequency (RF) equipment. One such system component is the broadband transceiver that transmit the multicarrier waveform as a suitable radio signal. Since the broadband transceiver is transmitting many channels in parallel, it must operate as linearly as possible to avoid adjacent channel and/or harmonic distortion in the resulting transmitted waveform. For example, certain digital wireless protocols such as the Global System for Mobile Communications (GSM) specify that the intermodulation distortion between adjacent channels must be such that a dynamic range of 70 decibels (dB) or more is available.

It has been found that although this approach is particularly advantageous in a multiuser wireless communication system where multiple signals must be transmitted at the same time such as at the base station location, the required digital-to-analog conversion places a limitation on the overall system performance. In particular, the digital-to-analog conversion introduces non-linearities that are manifested as spurious sidelobes. These spurious sidelobes limit the effective dynamic range of the radio transmitter.

Unfortunately, this limitation becomes significant as the number of desired carrier frequencies increases. At a point, it even becomes necessary to consider reverting to conventional types of single channel radio equipment in order to meet the required specification for spurious-free intermodulation distortion.

One approach to increasing spurious dynamic range is to add additional bits to the digital-to-analog converter. It is also possible to modify the analog amplifying circuitry to provide better linearity. However, each of these implementations require modification to a digital-to-analog subassembly design which in turn implies a much higher system cost.

What is needed is a way to increase the overall system performance by reducing the sidelobes produced in the digital-to-analog conversion process without unnecessarily complicating the digital signal processing hardware and without modifying the broadband analog radio equipment.

SUMMARY OF THE INVENTION

The present invention is a broadband multicarrier digital transceiver in which a number of digital signal processors produce a plurality of modulated digital waveforms at a baseband frequency. A digital combiner receives each of the baseband modulated digital signals and provides a single digital multicarrier waveform that consists of the individual digital waveforms frequency-translated to set of equally spaced carrier frequencies.

A first digital-to-analog converter is connected to receive the digital multicarrier waveform. This first digital-to-analog converter employs a particular known internal architecture to accomplish the digital-to-analog conversion process.

A second digital-to-analog converter also receives the digital multicarrier waveform in parallel with the first digital-to-analog converter. The second digital-to-analog converter has an internal architecture that is not the same as the internal architecture of the first digital-to-analog converter. The second digital-to-analog converter does, however, exhibit similar spurious responses of a similar magnitude as does the first digital-to-analog converter. The outputs of the two digital-to-analog converters are combined in a summing circuit and forwarded to an analog transmitter up converter. The up converted signal is then fed to multicarrier high power amplifier and radio frequency output hardware as may be needed to complete the transmission of the multicarrier radio frequency signal.

Because the two digital-to-analog converters use different internal architectures such as may be available from the same or different manufacturers, spurious intermodulation products are created by each converter in different ways and at different frequencies. As a result, these intermodulation products have a low cross correlation. By summing the outputs of the two digital-to-analog converters, their different spurious outputs result in a net improvement in the dynamic range. This is because the desired multicarrier digital waveforms add coherently, whereas the spurious signals do not add coherently, being at different frequencies.

Although the invention requires two complete digital-to-analog converters rather than a single one, it presents an approximately six decibel (dB) improvement in spurious-free dynamic range without a need to implement a custom internal digital-to-analog converter or Radio Frequency (RF) design.

The digital-to-analog converters may employ any number of different internal architectures such as binary current steering, segmented current source R-2R ladder, voltage switching, subranging, or other architectures.

BRIEF DESCRIPTION OF THE DRAWINGS

For a more complete understanding of the invention and its novel advantages and features, reference should be made to the accompanying drawings in which:

FIG. 1 is a block diagram of a broadband digital transmitter according to the invention;

FIG. 2C is a plot of the combined frequency responses of FIGS. 2A and 2B showing that spurious responses are reduced and that the desired signal response has remained at the same relative magnitude.

DETAILED DESCRIPTION OF A PREFERRED EMBODIMENT

Figure 2B:
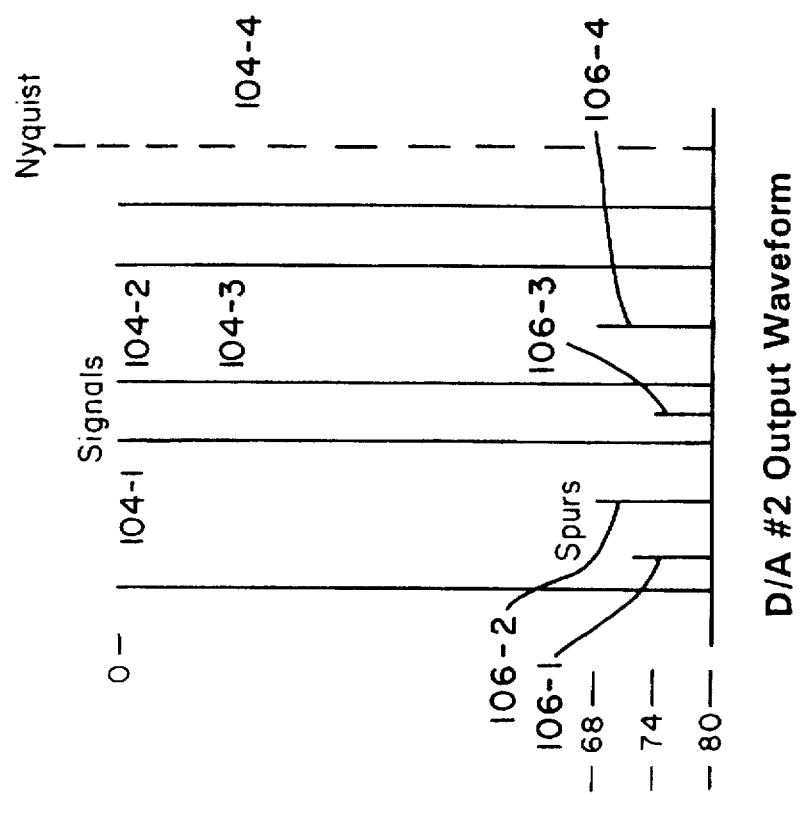
FIG. 2B is a plot of the frequency response of a second digital-to-analog converter to the same multicarrier modulated digital waveform.

Turning attention now to the drawings, FIG. 1 illustrates a broadband digital transmitter 10 that consists of a plurality of Digital Signal Processors (DSPs) 12-1, 12-2, . . . , 12-n, a digital combiner 14, an up-converter 16 consisting of first digital-to-analog converter 18-1, a second digital-to-analog converter 18-2, summing circuit 20, an Intermediate Frequency (IF) mixer 22, an IF local oscillator 24, an IF filter 26, a Radio Frequency (RF) mixer 28, an RF local oscillator 30, an RF transmit filter 32, a high power amplifier 34, a transmit bandpass filter 36 and antenna 40. The purpose of the broadband multicarrier transmitter 10 is to accept multiple digital signals in baseband format such as, for example, the digitized voice signals to be provided to a base station in a cellular communication system from a Public Switch Telephone Network (PSTN), and to then modulate and convert these digital signals into a composite transmitted waveform suitable for transmission over the antenna 40.

In operation, the plurality of DSPs 12 each receive a baseband digital signal that for example, is a digital voice signal, to be combined with other baseband digital signals and transmitted together through the broadband digital up-converter 16. Such an instance may occur in the base station of a cellular mobile telephone system, for example, where a transmitter is required to accept a number of digital voice signals from a telephone network and format these signals for radio transmission.

The digital signal processors 12 are each programmed to modulate a baseband digital signal in accordance with the desired modulation format. For example, in the case of a broadband digital transmitter intended to be used in a cellular communication system making use of Global System for Mobile Communications (GSM) signaling, the digital signal processors 12 each impart a Time Division Multiplex Multiple Access (TDMA) modulation. There may or may not be a one-to-one correspondence between the number of DSPs 12 and the number of baseband digital signals or the number of modulated digital signals.

The modulated digital signals are then fed to the digital combiner 14. The digital combiner 14 is an efficient digital filter bank synthesizer which makes use of multirate digital signal processing techniques to generate a composite baseband signal that represents the modulated digital waveforms that are output by the DSPs 12 modulated onto a plurality of carrier frequencies that are equally spaced apart in frequency. The digital combiner 14 typically makes use of multiple convolutional digital filters and inverse Fast Fourier Transform (FFT) techniques to implement the digital filter bank. The output of the digital combiner 14 is thus a composite multicarrier digital waveform.

The composite multicarrier waveform is in turn fed to at least two digital-to-analog converters 18-1 and 18-2. In accordance with the invention, the digital-to-analog converters 18 each employ a different internal architecture. One of the digital-to-analog converters 18-1 uses a technique such as segmented current source, binary current steering, R-2R ladder, voltage switching or subranging. The other digital-to-analog converter 18-2 uses a different one of these techniques. The two digital-to-analog converters typically have the same data rate and may or may not have the same number of bits in the data word. In a preferred embodiment, the first digital-to-analog converter 18-1 may be a 14-bit AD9764 converter manufactured by Analog Devices of Norwood, Massachusetts, which uses a CMOS segmented current source architecture. The second digital-to-analog converter 18-2 may be a HI5741 converter manufactured by Harris Corporation of Palm Bay, Fla., which uses a combined TTL/ECL R2R ladder for one-half of its internal structure, and a segmented current source architecture for the other half.

The digital-to-analog converters 18 are selected such that their spurious performance is of similar magnitude. For example, referring briefly to FIG. 2A, there is shown a plot of the frequency response of the first digital-to-analog converter 18-1. The dashed line to the right of the plot indicates the rate of one-half the sampling rate of the digital-to-analog converter 18-1. The desired signal components 100, 100-1, 100-2, 100-3, 100-4 appear at a zero (0) dBm power level. In this particular converter, spurious responses 102-1, 102-2 and 102-3 are observed at −68 dBm and below.

The response of the second digital-to-analog converter 18-2 is plotted in FIG. 2B. This response is similar to FIG. 2A with respect to the desired signal components 104-1, 104-2, 104-3 and 104-4. However, the spurious responses 106-1, 106-2, 106-3 and 106-4 are different for the second digital-to-analog converter 18-2. Indeed, not only do they occur at different frequencies and but may also be of different number. The spurious responses 102 for the first digital-to-analog converter 18-1 differ from the spurious products 104 for the second digital-to-analog converter 18-2 because the spurious products are created in different ways as a result of the different internal digital-to-analog architectures.

The outputs of the digital-to-analog converters 18-1 and 18-2 are fed to a summing circuit 20 which produces a combined analog signal. A plot of the frequency domain representation of the combined analog signal is shown in FIG. 2C. As can be seen, the desired signal components 100 and 104 have combined coherently to remain at the same frequency and with the same relative magnitudes. However, the spurious responses 102 and 106, being dissimilar in frequency and phase, add noncoherently. There is therefore a reduction in the overall available spurious-free dynamic range. In the example shown, this is approximately six (6) dBm. In particular, the spurious-free dynamic range available at the output of a single one of the digital-to-analog converters 18-1 or 18-2 is thus approximately 68 dBm. In the case of the combined outputs of two converters, the spurious-free dynamic range approaches 74 dBm.

Figure 2A:
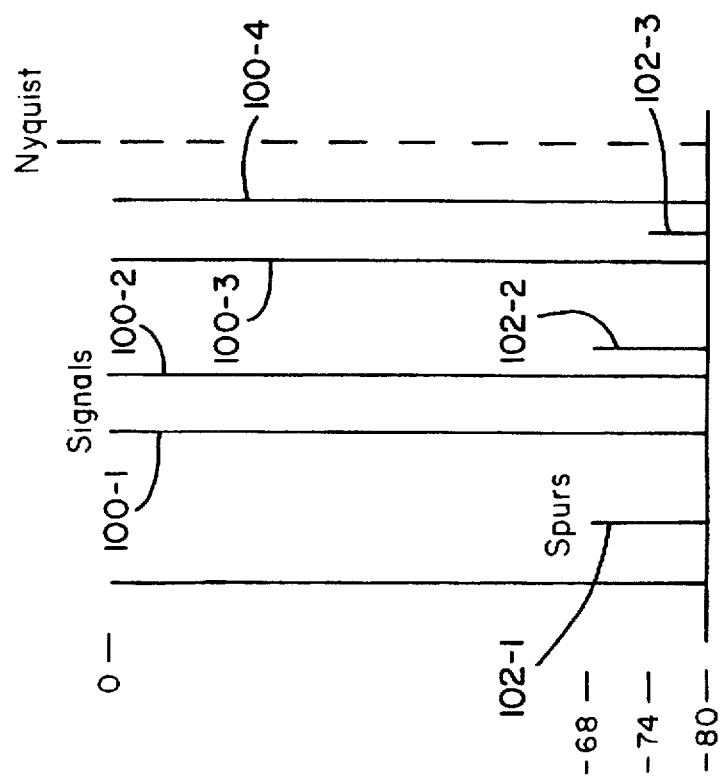
FIG. 2A is a plot of the frequency response of a first digital-to-analog converter to a specific multicarrier modulated digital waveform.

It has also been found that in order to determine whether the level of spurious responses are similar in the two D/A converters, it may not be possible to easily estimate spurious responses from a static observation such as FIGS. 2A or 2B. In such an instance, the spurious response can be estimated by observing time domain rise time and fall time response.

The output of the summing circuit 20 is fed to an Intermediate Frequency (IF) mixer 22. The IF mixer also receives a local reference signal from the IF local oscillator 24 and up-converts the baseband combined output waveform to an IF signal. The IF signal is then passed through the IF filter 26 in a known fashion to limit the response to the desired transmission bandwidth.

A final Radio Frequency (RF) stage is provided by the RF mixer 28, RF local oscillator 30 and RF transmit filter 32 to up-convert the multicarrier waveform to the desired radio frequency carrier. For example, in the case of a GSM cellular system, the desired RF carrier frequency is in the range of 900 Mhz.

Finally, the up-converted multicarrier signal is fed to a high power amplifier 34 and transmit bandpass filter 36 prior to being coupled to the antenna 40 for transmission. The high power amplifier 34 is typically a linear broadband multistage amplifier which amplifies the transmitter signal broadband multicarrier signal to a power level which is sufficient to complete a radio link between the transmitter and the intended receiving equipment.

It can now be understood how a broadband digital transceiver produces spurious products in digital-to-analog converter process that normally limits the dynamic range of the overall transmit path. This limitation may be removed by employing two or more digital-to-analog converters having different internal architectures that create spurious products in different ways that results in those spurious products falling at different frequencies in the output response. By combining the outputs of the two or more digital-to-analog converters, the desired signal components add coherently whereas the spurious responses not add. This improves the overall spurious performance of the system.

What is claimed is:

1. In a multichannel radio system such as a cellular base station, a broadband multicarrier transmitter assembly comprising:

digital signal modulation means, for generating a plurality of baseband modulated digital signals representing a plurality of baseband digital signals modulated according to a desired modulation scheme;

digital combiner means, for generating a composite digital signal representing the plurality of modulated digital channel signals offset in carrier frequency from one another to thereby produce a multicarrier modulated digital signal;

broadband digital transmitter means comprising:

a first digital-to-analog converter connected to receive the multicarrier modulated digital signal, the first digital-to-analog converter having a first internal component architecture, the first digital-to analog converter thereby providing a first converted multicarrier signal at an output;

a second digital-to-analog converter, connected to receive the multicarrier modulated digital signal, the second digital-to-analog converter having a second internal component architecture, the second digital-to-analog converter providing a second converted multicarrier signal at an output;

signal summing means for receiving the first converted multicarrier signal and the second converted multicarrier signal and for providing a combined output signal, wherein spurious responses produced by the first digital-to-analog converter and the spurious responses produced by the second digital-to-analog converter do not add coherently;

a power amplifier for receiving the broadband multicarrier transmit signal from the radio frequency up conversion stage, and for providing a high power amplifier output signals;

transmit bandpass filter means connected to receive the high power amplifier output signal and for providing a transmitter signal.

2. An apparatus as in claim 1 wherein the broadband digital transmitter means additionally includes a radio frequency up conversion stage.

3. An apparatus in claim 1 wherein the broadband digital transmitter means additionally includes an intermediate frequency up conversion stage.

4. An apparatus as in claim 1 wherein the first digital-to-analog conversion means uses a segmented current source internal architecture.

5. An apparatus as in claim 1 wherein the second digital-to-analog conversion means uses an R-2R ladder internal architecture.

6. An apparatus as in claim 5 wherein the second digital-to-analog conversion means also uses a segmented current source internal architecture.

7. An apparatus as in claim 1 wherein the first digital-to-analog converter means uses a voltage switching internal architecture.

8. An apparatus as in claim 1 wherein the first digital-to-analog converter means uses a subranging internal architecture.

* * * * *